A. H. ALKIRE.
AUTOMATIC BRAKE.
APPLICATION FILED FEB. 8, 1917.
1,228,734.
Patented June 5, 1917.
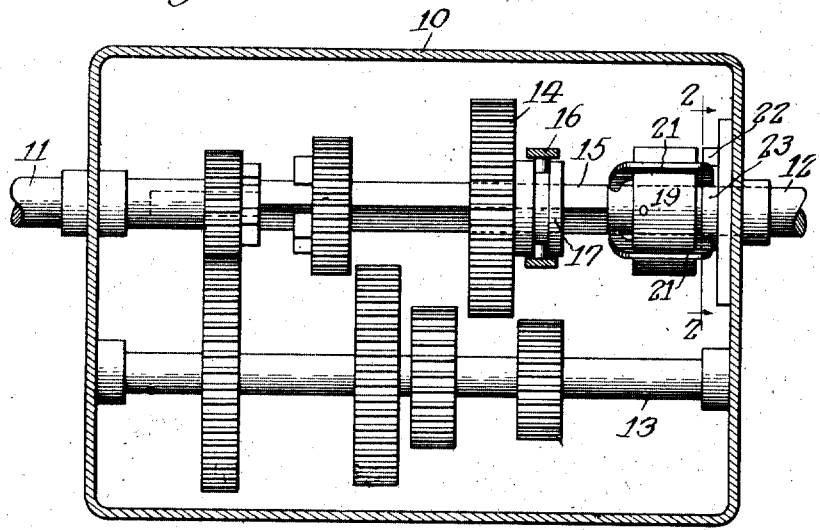
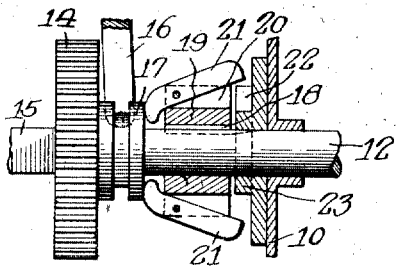
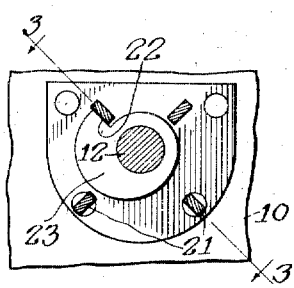
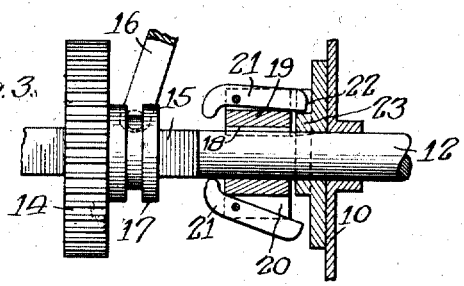
Witnesses:
Inventor
Albert H. Alkire

UNITED STATES PATENT OFFICE.

ALBERT H. ALKIRE, OF DES MOINES, IOWA.

AUTOMATIC BRAKE.

1,228,734. Specification of Letters Patent. Patented June 5, 1917.

Continuation of application Serial No. 132,139, filed November 18, 1916. This application filed February 8, 1917. Serial No. 147,383.

*To all whom it may concern:*

Be it known that I, ALBERT H. ALKIRE, a citizen of the United States, and resident of Des Moines, in the county of Polk and State of Iowa, have invented certain new and useful Improvements in Automatic Brakes, of which the following is a specification.

My invention relates generally to self-propelled vehicles and specifically to an automatically operating brake for preventing accidental retrograde movement of the vehicle.

This application is a continuation of my application Serial No. 132,139, filed November 18, 1916.

It is well known that means should be provided for preventing backward movement of an automobile except as required by the driver and many devices having that object in view have been proposed. A fundamental objection to all thereof has been that the parts constituting the checking element have been active during normal forward movement of the vehicle. This resulted in wear and failure at the time when most required.

An object in the present structure is to provide an automatically operating clutch for preventing accidental backward movement, the operative or movable parts of which are rigidly held in fixed position during normal operation. In the device as I propose to construct it the clutch elements are held out of contact by utilizing a well known mechanical principle, that of centrifugal force. Thus during normal operation there is no actuation of the clutch element. The only movement of any of the clutch parts is just at the instant of starting and stopping. Thus the amount of wear of the parts is negligible, particularly in view of the fact that the parts are preferably located within the transmission case and operate in a bath of grease or heavy oil.

One of the important advantages of a construction such as described is its simplicity and consequent low first cost. It is needless to dwell upon these requisites to the adoption of any device as standard equipment by automobile builders as they are well known. It may be pointed out, however, that the adaption of the device to a standard transmission mechanism will not complicate the same or add materially to the cost thereof. No additional shafts or gears are required and the added weight is slight. The operation of the device is not dependent upon the volition of the driver, nor will it interfere with the operation if it be necessary to operate the car in a reverse direction.

The invention will be more readily understood by reference to the accompanying drawings, wherein, Figure 1 is a plan view of an open transmission case showing a conventional form of transmission mechanism, my invention being shown in connection therewith; Fig. 2 is a sectional view on the line 2—2 of Fig. 1; Fig. 3 is a sectional view on the line 3—3 of Fig. 2, and, Fig. 4 is a similar view showing the parts in the position they will assume when the reverse gears are in mesh.

In the drawings, the gear case is indicated at 10, and the transmission shaft at 11. This shaft is intermittently connected to the engine through a friction clutch, neither the engine nor the clutch being illustrated. The propeller shaft 12, is connected to the driving wheels through the usual differential. The transmission mechanism includes a counter-shaft 13, having certain gears thereon, one of which is intended to mesh with the reverse gear 14. This gear is shifted on the squared portion 15, of the propeller shaft by means of a yoke 16, which engages a hub 17, rigid with the gear. Secured to the propeller shaft 12, by means of a key 18, is a strongly built collar 19, having in this instance four longitudinal peripheral slots 20, therein. Pivoted at one end of each of said slots is a pawl 21, both ends of which project outside of the limits of the collar. The pawls are pivoted at such point with such relation to the location of the weight thereof that the heaviest end is at a point farthest removed from the reverse gear 14, with the object in view of causing the pawls to assume an extreme outward position such as is shown in Fig. 4, whenever the propeller shaft is rotated. In Fig. 4 the pawls are shown as forcibly held in outward position by contact of the hub 17, of the reverse gear therewith. However, the pawls will assume the same position when the propeller shaft is rotated even though the reverse gear be in the position of Fig. 1. When the propeller shaft is idle, however, the parts will assume the position shown in Fig. 3; that is, the two lower pawls will be in extended position while the two upper pawls will drop by gravity into such position as to engage with the face 22, of a cam 23, rigidly secured to the wall of the transmission case 10. The arrangement is such that when the propeller shaft is rotated to the right, as viewed in Fig. 2, the pawls cannot engage the shoulder even though they are not held out of engagement by centrifugal force. When, however, the propeller shaft stops even for an instant, one of the four pawls will drop by gravity and prevent backward movement of the car. If the driver wishes to run backward he will by means of his gear shift lever move the reverse gear to the right, as viewed in Fig. 1, thus causing the pawls to occupy the position of Fig. 4.

By providing a plurality of pawls there is an assurance of operation of at least one thereof, and furthermore, the weight is balanced upon the propeller shaft thereby avoiding unequal wear or pounding.

By mounting the pawls in long slots of the character shown and by locating the collar 19, close to the cam, the ends of the pawls are in direct shear and there is practically no bending tendency. This involves the use of comparatively light weight members. During normal operation the pawls do not move at all; that is, so long as the propeller shaft is rotated the pawls are held in a fixed position by centrifugal force. The only movement of the pawls occurs when the car stops. Thus wear is negligible.

Obviously the form of mounting of the pawls is immaterial it being only necessary that the weight thereof be so disposed as to cause the same to remain out of engagement with the cam by centrifugal force during normal operation.

I claim:

1. In a device of the class described, the combination of a driven shaft, a stop in proximity thereto, a pawl mounted on said shaft on a transverse pivot and unbalanced with relation to said pivot, said pawl being mounted in such relation to said stop as to engage the same when the shaft is stopped and to be rigidly held out of engagement by centrifugal force when said shaft is rotated and means for retaining said pawl in an inoperative position to permit of reverse rotation of said shaft, substantially as described.

2. In a device of the class described, the combination of a propeller shaft, a cam adjacent thereto, a longitudinally slotted collar mounted on the shaft, and a lever mounted in the slot, the heavy end of which lever projects beyond the limits of said collar and engages said cam when the parts are still, and is centrifugally maintained out of contact with said cam when said shaft is rotated, substantially as described.

3. In a safety brake, the combination of a shaft, a slotted collar thereon, an unbalanced pawl in said slot, a cam with which said pawl may coöperate to prevent accidental reverse rotation of said shaft and means for retaining said pawl in an inoperative position to permit of reverse rotation of said shaft, substantially as described.

4. In a safety brake, the combination of a shaft, a cam stop adjacent thereto, a pawl mounted on said shaft on a tangential pivot, said pawl being unbalanced and the heavy end being adapted to contact said cam stop, and a stop carried by the shaft and opposed to said cam stop and adapted to support the end of said pawl at a point close to its point of engagement with the cam stop, substantially as described.

5. In a safety brake, the combination of a shaft, a cam stop adjacent thereto, a pawl mounted on said shaft on a tangential pivot, said pawl being unbalanced and the heavy end being adapted to contact said cam stop, a stop carried by the shaft and opposed to said cam stop and adapted to support the end of said pawl at a point close to its point of engagement with the cam stop, and means operative by the reverse gears for positively holding said pawl out of engagement with said cam stop, substantially as described.

6. In an automobile brake, the combination with the transmission shaft, a pawl pivotally mounted thereon, and a ratchet tooth fixed in the path of the pawl and having an abrupt face and an inclined face over which latter the pawl slides when the shaft is revolving in a direction to move the machine forward, of means connected with the reverse lever for holding the pawl out of contact with said tooth, substantially as described.

7. In an automobile brake, the combination with the transmission shaft, a pawl pivotally mounted thereon, and a ratchet tooth fixed in the path of the pawl and having an abrupt face and an inclined face over which latter the pawl slides when the shaft is revolving in a direction to move the machine forward, of an element slidably mounted on the shaft and adapted in one position to hold the pawl out of contact with said ratchet tooth, and connections between said element and the reverse lever, for the purpose set forth.

8. In an automobile brake, the combination with the transmission shaft, a disk fixed thereon, a pawl pivoted in the edge of the disk and having one end heavy and the other end turned inward toward the shaft, and a ratchet tooth fixed on an adjacent member in the path of the heavy end of the pawl, of another disk slidably mounted on the shaft adjacent said inturned end of the pawl, and connections between this disk and the reverse lever, whereby movement of the lever slides the disk and throws the heavy end of the pawl outward, for the purpose set forth.

9. In an automobile brake, the combination with the transmission shaft, a pawl pivotally mounted thereon, and a ratchet tooth fixed in the path of the pawl and having an abrupt face and an inclined face, of an element slidably mounted on the shaft and adapted in one position to hold the pawl out of contact with said ratchet tooth, a lever within reach of the driver, and connections between said element and the lever, for the purpose set forth.

Signed at Dallas Center, Iowa, this third day of February, 1917.

ALBERT H. ALKIRE.

Witnesses:
 BERT EMMERT,
 LOUIE S. EMMERT.